United States Patent Office 3,522,200
Patented July 28, 1970

3,522,200
FILM-FORMING EMULSIONS
Dietrich Hardt and Dietrich Glabisch, Opladen, Heinrich Meckbach, Leverkusen, and Herbert Bartl, Cologne-Stammheim, Germany, assignors to Farbenfabriken Bayer Aktiengesellschaft, Leverkusen, Germany, a corporation of Germany
No Drawing. Filed July 5, 1967, Ser. No. 651,157
Claims priority, application Germany, Aug. 5, 1966, F 49,876; Sept. 27, 1966, F 50,295
Int. Cl. C08f 45/24, 29/22
U.S. Cl. 260—29.6      4 Claims

ABSTRACT OF THE DISCLOSURE

Graft copolymer latices from ethylene vinyl chloride copolymers and methacrylic esters or styrene or vinylidene chloride and a process for their production and use in dispersion paints and coating agents.

---

This invention relates to special latices of graft copolymers from ethylene/vinyl chloride copolymers and methacrylic esters or styrene or vinylidene chloride and a process for their production.

It is known that emulsions of ethylene/vinyl chloride copolymers can be obtained by polymerizing ethylene and vinyl chloride in an aqueous medium at an elevated temperature and pressure in the presence of emulsifiers. The copolymers which can be isolated from emulsions such as these may vary widely in composition. Copolymers containing approximately 30% to 70% by weight of vinyl chloride are soft and rubber-like and extremely tacky. Products containing more than 75% by weight of vinyl chloride are increasingly hard and brittle.

Emulsions of non-tacky ethylene/vinyl chloride copolymers have the disadvantage that, when coated onto suitable substrates, they only give extremely turbid and brittle films. For this reason, it is preferred to use only the very narrow range of copolymer emulsions containing approximately 40% to 70% by weight of vinyl chloride (corresponding to a molar ratio of ethylene:vinyl chloride in the range of from 1:0.3 to 1:1.05) for film-forming coatings and impregnations. Although it is possible by drying emulsions such as these to obtain coherent, clear and elastic films, the films have the disadvantage that they are extremely tacky and are not strong enough for certain applications. There are thus many purposes for which copolymers of this kind cannot be used.

Attempts have already been made to obtain non-tacky products of high surface gloss by grafting vinyl chloride onto ethylene/vinyl chloride copolymer emulsions. Unfortunately, polymers such as these have the disadvantage of inadequate thermal stability and, in addition to this, show no real resistance to prolonged weathering. For this reason, they usually do not satisfy the requirements made of a binder for the production of pigment dispersions for outdoor paints.

The present invention relates to stable aqueous emulsions based on ethylene/vinyl chloride copolymers and to a process for their production. In the process, optionally in the presence of emulsifiers, 15 to 100 parts by weight of a methacrylic ester containing 1 to 6 carbon atoms in the ester portion or styrene or vinylidene chloride are polymerised in the presence of 100 parts by weight of an ethylene/vinyl chloride copolymer consisting of 25% to 70% by weight of vinyl chloride and 75% to 30% by weight of ethylene, the copolymer being used in the form of a 20% to 50% by weight latex.

Suitable methacrylic esters include those containing 1 to 6 carbon atoms in the ester alkyl such as, for example, methyl methacrylate, ethyl methacrylate, butyl methacrylate, cyclohexyl methacrylate and 2-hydroxypropyl-methacrylate. It is of particular advantage to use methyl methacrylate.

In the emulsions and in the process of the invention there may be substituted up to 50% by weight of the styrene or vinylidene chloride by (a) acrylic acid esters or methacrylic acid esters having 1 to 8 carbon atoms in the ester alkyl such as ethyl acrylate, butyl acrylate, 2-ethylhexyl acrylate and methyl methacrylate,
(b) acrylonitrile,
(c) vinyl esters having 2–7 carbon atoms in the carboxylic acid portion such as vinyl acetate, vinyl propionate and vinyl benzoate, to obtain special modifications with regard to hardness, surface gloss, elasticity or pigment-absorbing capacity of the graft polymers. Furthermore mixture of said monomers (a) to (c) may be used.

Of special interest there are mixtures of styrene and methyl methacrylate or vinylidene chloride and (meth) acrylic esters having 1–8 carbon atoms in the ester alkyl.

The preparation of the copolymer emulsions of ethylene and vinyl chloride used as a starting material is described in the literature, and may be carried out for example in accordance with British patent specification No. 578,584 or German patent specification No. 1,022,796. Pressures of from 100 to 300 atü are usually necessary and adequate for this purpose. The temperatures are in the range of from 65° to 85° C. Water-soluble per compounds such as for example potassium peroxydisulphate or Redox systems such as potassium peroxydisulphate/sodium pyrosulphite, for example, may be used as initiators. It is of advantage to use emulsifiers in order to obtain stable emulsions and buffer substances such as dipotassium hydrogen phosphate, sodium tetraborate, diammonium hydrogen phosphate or sodium acetate in order to maintain the requisite pH-values.

Examples of suitable emulsifiers include the alkali metal salts of relatively high molecular weight aliphatic sulphonic acids, oxyethylation products of higher fatty alcohols or phenols such as, for example, an addition product of 10 to 50 mols of ethylene oxide with nonylphenol or octadecanol.

The latices used as a starting material should have a solids content of between 20% and 50% by weight. The concentration selected is with advantage such that an end product with a solids content of between 50% and 55% by weight is obtained by grafting of the monomers. The advantage of the high solids content which can be obtained is that there is usually no need for further concentration. If, however, solids contents of from about 22% to 35% by weight are obtained, the graft polymer latices can be effectively concentrated to solids contents of between 55% and 65% by weight either by evaporation or more conveniently by creaming up.

Graft polymerisation of the monomers is initiated by water-soluble substances which form free radicals, in particular inorganic per compounds such as, for example, potassium, sodium or ammonium persulphates, perborates, hydrogen peroxide or others.

The aforementioned water-soluble percompound may also be used in the form of Redox systems, i.e. in combination with reducing agents, as known per se. Suitable reducing agents are, for example, sodium pyrosulphite or bisulphite, sodium formaldehyde sulphoxylate or triethanolamine. In this case, initiator components of between 0.1% and 3% by weight based on the polymer are adequate for the production of stable graft polymer emulsions.

Graft polymersation may be carried out at temperatures of between 20° C. and 80° C. although polymerisation is preferably carried out at temperatures of from 40° C. to 60° C.

Generally speaking, there is no need to add further quantities of emulsifier and of buffer substances to the starting latex because the quantities present in the latex are themselves sufficient to gurantee the formation of a stable graft latex. It is possible, however, in special cases to add further quantities of the aforementioned emulsifiers or buffers.

The quantity in which the monomers to be grafted is used is governed by the properties required of the polymer. As the monomeric component increases, so the graft polymers become harder and more solid so that, where the polymerised grafted monomer is greater than 50%, based on solid ethylene/vinyl chloride/monomer graft copolymer, the films become hard and crack.

Thus, it is possible by the process according to the invention to obtain latices, with a solids content of approximately 22% to 55% by weight, of a graft copolymer of 50% to 88% by weight of a graft base consisting of:

25% to 70% by weight of copolymerised vinyl chloride;
75% to 30% by weight of copolymerised ethylene; and
12% to 50% by weight of a grafted-on methacrylate containing up to 6 carbon atoms in the ester alkyl or ester cycloalkyl group, styrene or vinylidene chloride whereby up to 50% by weight of the styrene or vinylidene chloride may be substituted by monomers of the aforementioned groups (a) to (c).

In many cases, the polymer films are required to have little or no water-absorbing capacity. Since the sensitivity to water of polymer films is mainly attributable to the use of emulsifiers, efforts should be made to manage with a small quantity of emulsifier.

In a preferred embodiment of the process according to the invention, stable aqueous emulsions of ethylene/vinyl chloride/monomers copolymers are obtained which, on drying, give nontacky, thermally stable, weather-resistant and flexible films with a limited tendency to absorb water. In this embodiment of the process, 15 to 100 parts by weight of methacrylic ester or styrene or vinylidene chloride, whereby up to 50% by weight of the styrene or vinylidene chloride may be substituted by monomers of the aforementioned groups (a) to (c) or by mixture thereof, are polymerised in the absence of conventional emulsifiers with 100 parts by weight of solid components of ethylene/vinyl chloride copolymer latices prepared in the absence of conventional emulsifiers, but in the presence of from 2% to 10% by weight of a salt of a semi-ester of maleic acid and an aliphatic or cycloaliphatic monohydric alcohol containing up to 18 C-atoms in the alcohol component, or of a salt of a polymerisable unsaturated sulphonic acid. In this case, latices with a solids content of from 22% to 55% by weight are obtained from a graft copolymer of:

50% to 88% by weight of a graft base consisting of from

25% to 70% by weight of copolymerised vinyl chloride;
73% to 20% by weight of copolymerised ethylene;
2% to 10% by weight of copolymerised units of a salt of a semiester of maleic acid and an aliphatic or cycloaliphatic alcohol with up to 18 C-atoms, or of a salt of a polymersiable unsaturated sulphonic acid; and 12 to 50% by weight of a grafted-on methacrylic ester containing up to 6 carbon atoms in the ester alkyl or ester cycloalkyl group, styrene or vinylidene chloride, whereby up to 50% by weight of the styrene or vinylidene chloride may be substituted by monomers of the aforementioned groups (a) to (c).

In the preferred embodiment of the process according to the invention, it is preferred to use semiesters of maleic acid and linear saturated aliphatic monohydric alcohols with 3 to 18 C-atoms, such as, for example, propanol, butanol, pentanol, hexanol, n-octanol, 2-ethylhexanol, trimethyl hexanol, n-dodecanol or cycloaliphatic alcohols such as cyclohexanol. The aforementioned acid esters are with advantage used in the form of their salts in particular their alkali metal or ammonium salts. The salts of unsaturated polymerisable sulphonic acids such as, for example, sodium vinyl sulphonate, sodium styrene sulphonate or (meth)acryloxethane sulphonate, may be used as the additional special copolymerisation component.

Mixtures of the aforementioned semiesters and acids may of course also be used.

The requisite quantities in which the third components are used are governed by the properties required of the copolymer to be produced. They should be minimised as far as possible in order not to reduce the resistance to water either of the resulting polymers or of the coatings which can be obtained with the emulsions. On the other hand, it has been found that a minimum of copolymerised acid units is required to guarantee a high level of stability in the polymer emulsions. Accordingly, between 2% and 10% by weight, and preferably between 3% and 8% by weight, of the aforementioned maleic acid semiesters or sulphonic acid salts should be copolymerised.

It is readily possible simultaneously to graft on small quantities of other monomers (up to about 20% by weight of the polymer to be grafted on) with the methacrylic ester in order to obtain special modifications. Although this does not have any basic effect on the character of the graft polymer, it is possible by adding further monomers to produce changes with regard to hardness, surface gloss, elasticity or pigment-absorbing capacity. Examples of such monomers include styrene, acrylic esters with 1 to 8 carbon atoms in the ester alkyl such as methyl acrylate, ethyl acrylate, butyl acrylate, 2-ethylhexyl acrylate, acrylonitrile, vinylidene chloride, vinyl esters of vinyl alcohol and carboxylic acids with 1 to 7 carbon atoms, such as, for example, vinyl acetate, vinyl propionate and vinyl benzoate.

In the process according to the invention, the ethylene/vinyl chloride copolymers with vinyl chloride components of about between 40% and 70% by weight which, owing to their tackiness, are only of limited use, are modified to such an extent that films are formed which, in relation to the starting polymer, are distinguished by the complete absence of tackiness, much greater strength, outstanding flexibility, extremely high thermal stability and weather resistance. Accordingly, the emulsions according to the invention are eminently suitable for coatings and for covering suitable surfaces such as wood, metals, plastics, glass, paper, etc.

In particular, it has been found that the emulsions according to the invention are distinguished by their high degree of compatibility with fillers and by their high capacity for absorbing pigments. Accordingly, these emulsions may be used to advantage as binders in the production of pigment dispersions which in turn yield non-tacky, waterproof and flexible coatings of high bond strength on paper, wallpaper, wood, masonry, concrete, asbestos, etc.

In cases in which it is intended to use the products as binders in the production of paints for indoor and outdoor use, it is readily possible to add UV-stabilisers to the latices in quantities of from 0.1% to 2% by weight.

The percentages in the examples are percent by weight unless otherwise mentioned.

EXAMPLE 1

The starting latex A, whose solids component consists of a copolymer of ethylene, vinyl chloride and maleic acid cyclohexyl semiester, is stirred for 30 minutes at room temperature with the additives listed in column B. The resulting mixtures are then heated to the reaction temperatures indicated in the table to initiate graft polymerisation. Latices almost entirely free of coagulate are obtained which on drying leave behind clear, coherent and non-tacky films of high strength. The products are partially cross-linked. If the dry films are heated in a drying cabinet for 2 hours at 150° C. only a slight yellow to brown discolouration occurs, its intensity increasing as the chlorine content increases. Comparison films prepared by grafting vinyl chloride onto base A turn deep violet to black in colour under the same conditions (Table 1):

EXAMPLE 3

650 g. of a 25.7% ethylene/vinyl chloride latex containing 1% of a long-chain alkyl-sulphonic acid as an emulsifier and 1% of $K_2HPO_4$, based on the total weight, are stirred for 30 minutes with 0.325 g. of potassium persulphate and 50 g. of methyl methacrylate. The copolymerised vinyl chloride content of the ethylene/vinyl chloride copolymer comprises 61.2% by weight. The mixture is then heated while stirring for 10 hours to 45° C. and for 5 hours to 55° C. during which graft polymerisation takes place. A coagulate-free latex with a concentration of 31% by weight is obtained whose solid component contains 27.45% by weight of chlorine, which corresponds to the following compositions:

19% by weight of polymethacrylate (grafted-on); and
81% by weight of ethylene/vinyl chloride copolymer (61.2% by weight of polymerised vinyl chloride).

On drying, the product leaves behind a clear, coherent, non-tacky film.

EXAMPLE 4

1000 g. of a 30% ethylene/vinyl chloride latex whose composition is as described in Example 2, are stirred for 30 minutes with 50 g. of 2-hydroxypropyl-methacrylate, 10 g. of a long-chain alkyl-sulphonic acid as an emulsifier

TABLE 1

| Composition of starting latex A | | | Graft mixture/conditions B | | | | | | | Graft product/composition of solid component | | | |
|---|---|---|---|---|---|---|---|---|---|---|---|---|---|
| Solids content, percent by weight | Quantity of M in solid copolymer, percent by wt. | VCI in percent by weight | Quantity of A, g. | K-per-sulphate, g. | Na-pyro-sulphite, g. | $K_2HPO_4$, g. | MAM, g. | T, °C. | t, h | Percent by weight Cl | Percent by weight $A_1$ | Percent by weight MAM | Solids content of the end latex in percent by weight |
| 30 | 5 | 27.8 | 1,000 | 0.5 | | | 100 | 45/55 | 10/5 | 13.65 | 87.5 | 12.5 | 31 |
| 30 | 5 | 27.8 | 1,000 | 0.5 | | 0.5 | 300 | 45/55 | 10/5 | 9.2 | 59 | 41 | 39 |
| 30 | 6 | 56.7 | 1,000 | 0.5 | | | 100 | 45/55 | 10/5 | 25.7 | 81 | 19 | 33 |
| 30 | 6 | 56.7 | 1,000 | 0.5 | | 0.5 | 300 | 45/55 | 10/5 | 17.45 | 54.5 | 45.5 | 42 |
| 30 | 5 | 61 | 1,000 | 1.0 | | 0.5 | 50 | 45/55 | 10/5 | 32.1 | 93.5 | 6.5 | 31 |
| 30 | 5 | 61 | 1,000 | 0.25 | 0.15 | | 100 | 45 | 15 | 28.0 | 82 | 18 | 33 |
| 30 | 5 | 61 | 1,000 | 1.0 | | 0.5 | 300 | 45/55 | 10/5 | 19.2 | 55.7 | 44.3 | 42 |
| 47 | 5 | 62 | 642 | 0.5 | 0.25 | | 100 | 45 | 15 | 28.1 | 80.5 | 19.5 | 54 |

M=maleic acid cyclohexyl semiester; VCI=polyvinyl chloride in the copolymer; MAM=methyl methacrylate; T=temperature; t=time; $A_1$=graft base of latex A [T=45/55; t=10/5/5; h=10 hours polymerisation at 45° C. and 5 hours at 55° C.].

EXAMPLE 2

1000 g. of a 30% latex, whose solid component is a copolymer of 3% by weight of vinyl sulphonic acid (Na salt), 63% by weight of vinyl chloride and 34% by weight of ethylene, are mixed with 0.5 g. of potassium persulphate, 0.25 g. of sodium pyrosulphite and a mixture of 120 g. of methyl methacrylate and 30 g. of styrene. After it has been stirred for 30 minutes at 20° C. the mixture is heated to 45° C. over a period of 15 hours during which graft polymerisation takes place. A coagulate-free latex with a solids content of approximately 38% by weight is obtained which gives non-tacky, glossy and coherent films when dried in air.

The solid component consists of polymerised units of 42% by weight of vinyl sulphonic acid (Na salt); 25.2% by weight of methyl methacrylate and 5.5% by weight of styrene, in the form of a graft copolymer. The product is partly cross-linked.

and 0.5 g. of potassium persulphate. The mixture is then heated for 10 hours to 45° C. and for 5 hours to 55° C. to obtain graft polymerisation. A latex with a solids content of approximately 32% by weight is obtained, whose solid component consists of 11.5% by weight of polymerised hydroxyester and 88.5% by weight of the graft base.

The film obtained on drying in air is coherent and almost completely non-tacky.

EXAMPLE 5

Monomers or monomer mixtures to be defined in more detail below are polymerised in a pressure vessel equipped with stirrer, for 20 hours at 55° C. in the presence of a 30% latex, the solid confined therein consisting of copolymer of 61% vinyl chloride, 5% maleic acid cyclohexyl semiester and 34% of ethylene, with the addition of 0.25 g. of potassium persulphate as initiator. The quantity of latex introduced into the reaction vessel is 200 g.

| Monomer added | Analysis of solids in graft latex | | Solids content graft latex, percent |
|---|---|---|---|
| | Percent Cl | Percent O | |
| (a) 30 g. vinylidene chloride | 47.7 | | 37.4 |
| (b) 60 g. vinylidene chloride | 53.8 | | 44 |
| (c) 30 g. vinylidene chloride plus 15 g. methylmethacrylate | 41.0 | 6.7 | 41 |
| (d) 30 g. vinylidene chloride plus 15 g. ethyl acrylate | 42.1 | 6.2 | 39 |
| (e) 60 g. vinylidene chloride plus 10 g. ethyl acrylate | 49.9 | 4.2 | 47 |

Latices which are practically free from coagulate and which leave coherent, firm, non-tacky films on drying are obtained.

EXAMPLE 6

Styrene or a mixture of styrene and methyl methacrylate in quantities given in the table below are polymerised for 10 hours at 45° C. and 5 hours at 55° C. in a vessel equipped with stirrer in the presence of 240 g. of a 40% latex in which the solids content consists of a copolymer of 38.9% vinyl chloride, 5% maleic acid cyclohexyl semiester and 56.1% ethylene, with the addition of 0.12 g. of potassium persulphate.

| Monomers used | Analysis of solids content of graft latex | | Solids content of graft latex, percent |
|---|---|---|---|
| | Percent Cl | Percent O | |
| (a) 36 g. styrene | 14.6 | | 39 |
| (b) 24 g. styrene plus 24 g. methyl methacrylate | 13.3 | 8.38 | 42 |

Stable latices free from coagulate are obtained which, when creamed up, leave behind non-tacky, firm, coherent films.

If styrene or a mixture of styrene and methyl methacrylate are polymerised in a similar manner in the presence of 1000 g. of a 30% latex whose solids content is composed of a copolymer of 61% vinyl chloride, 5% maleic acid cyclohexyl semiester and 34% of ethylene, with the addition of 0.5 g. of potassium persulphate as initiator, non-tacky, firm, coherent films are again obtained when the latices, free from coagulate, are dried. The quantities of monomers used for 1000 g. of latex base are shown in the following table.

| Monomers used | Analysis of solids content of graft latex | | Solids content of graft latex, percent |
|---|---|---|---|
| | Percent Cl | Percent O | |
| (a) 200 g. styrene | 21.85 | | 41 |
| (b) 300 g. styrene | 18.35 | | 46 |
| (c) 150 g. styrene plus 150 g. methyl methacrylate | 18.6 | 8.76 | 45.6 |

EXAMPLE 7

1000 g. of a 30% latex the solids contained therein consisting of a copolymer of 56% vinyl chloride and 43.3% ethylene are mixed with 10 g. of a long chained alkyl sulphonic acid as emulsifier, 0.5 g. of potassium persulphate and 100 g. of styrene. The reaction mixture is then polymerised for 10 hours at 45° C. and then for 5 hours at 55° C. with stirring.

A coagulate-free latex is obtained which has a solids content of 35.5%. The chlorine content of the solid polymer is 24.8%. When the latex is dried in air, non-tacky, coherent films are obtained.

EXAMPLE 8

If a 30% latex which has a polyvinyl chloride content in the solid product of 69.8% is used under the same initial conditions as in Example 3, a coagulate-free graft latex which has good film forming capacity and a solids content of 31.5% is obtained. The chlorine content of the solid product is 34%.

EXAMPLE 9

1000 g. of a 30% latex the solids content of which consists of a copolymer as described in Example 5 was mixed with 0.5 g. of potassium persulphate and the monomer mixtures A and B and heated, with stirring, for 10 hours at 45° C. and then for 5 hours at 55° C., so that polymerisation took place.

| Monomers used | Analysis of solids content of graft latex | | | Solids content of graft latex, percent |
|---|---|---|---|---|
| | Percent Cl | Percent N | Percent O | |
| (A) 100 g. styrene plus 50 g. methyl methacrylate plus 50 g. acrylonitrile | 18.5 | 2.2 | 4.2 | 45 |
| (B) 200 g. styrene plus 20 g. ethyl acrylate plus 30 g. acrylonitrile | 19.3 | 1.2 | 3.3 | 43 |

Coagulate-free latices are obtained which on drying leave behind non-tacky firm, coherent films.

What is claimed is:

1. Latices with solids contents of 22% to 55% by weight, of a graft copolymer of:
   50% to 88% by weight of a graft base consisting of
   25% to 70% by weight of copolymerised vinyl chloride;
   75% to 30% by weight of copolymerised ethylene; and
   12% to 50% by weight of grafted-on methacrylic ester with up to 6 carbon atoms in the ester alkyl or ester cycloalkyl group.

2. Latices with solids contents of 22% to 55% by weight of a graft copolymer of:
   50% to 88% by weight of a graft base consisting of
   25% to 70% by weight of copolymerised vinyl chloride;
   75% to 30% by weight of copolymerised ethylene; and
   12% to 50% by weight of grafted-on styrene or vinylidene chloride whereby up to 50% by weight of these monomers may be substituted by polymerised units of
      (a) acrylic acid ester or methacrylic acid esters having 1 to 8 carbon atoms in the ester alkyl,
      (b) acrylonitrile,
      (c) vinyl esters with 2 to 7 carbon atoms in the carboxylic acid portion.

3. Latices with a solids content of 22% to 55% by weight, of a graft copolymer of:
   50% to 88% by weight of a graft base consisting of
   25% to 70% by weight of copolymerised vinyl chloride;
   73% to 20% by weight of copolymerised ethylene;
   2% to 10% by weight of copolymerised units of a salt of a semi-ester of maleic acid and an aliphatic or cycloaliphatic alcohol with from 1 to 18 carbon atoms, or of a salt of a polymerisable unsaturated sulphonic acid; and
   12% to 50% by weight of a grafted-on methacrylic ester with up to 6 carbon atoms in the ester alkyl or ester cycloalkyl group.

4. Latices with solids contents of 22% to 55% by weight, of a graft copolymer of:
   50% to 88% by weight of a graft base consisting of
   25% to 70% by weight of copolymerised vinyl chloride;
   73% to 20% by weight of copolymerised ethylene;
   2% to 10% by weight of copolymerised units of a salt of a semi-ester of maleic acid and an aliphatic or cycloaliphatic alcohol with from 1 to 18 carbon atoms, or of a salt of a polymerisable unsaturated sulphonic acid; and
   12% to 50% by weight of a grafted-on styrene or vinylidene chloride, whereby up to 50% by weight of these monomers may be substituted by polymerised units of:
(a) acrylic acid ester or methacrylic acid esters having 1 to 8 carbon atoms in the ester alkyl,
(b) acrylonitrile,
(c) vinyl esters with 2 to 7 carbon atoms in the carboxylic acid portion.

References Cited

UNITED STATES PATENTS 2,791,600 5/1957 Schwaegerle,
3,290,265 12/1966 Kaneko.
3,373,229 3/1968 Philpot et al.

FOREIGN PATENTS 1,211,395 2/1966 Germany.

MURRAY TILLMAN, Primary Examiner
H. ROBERTS, Assistant Examiner

U.S. Cl. X.R.
117—133, 148, 155, 161; 260—878